(12) United States Patent
Suzuki et al.

(10) Patent No.: US 9,019,290 B2
(45) Date of Patent: Apr. 28, 2015

(54) INFORMATION PROCESSING APPARATUS, INFORMATION PROCESSING SYSTEM, INFORMATION PROCESSING METHOD AND PROGRAM

(75) Inventors: Mamoru Suzuki, Kanagawa (JP); Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1053 days.

(21) Appl. No.: 12/331,584

(22) Filed: Dec. 10, 2008

(65) Prior Publication Data
US 2009/0201304 A1 Aug. 13, 2009

(30) Foreign Application Priority Data
Feb. 8, 2008 (JP) ................................. 2008-029739

(51) Int. Cl.
G06T 1/60 (2006.01)
G09G 5/00 (2006.01)
H04Q 1/38 (2006.01)
G06K 19/07 (2006.01)
G06K 19/077 (2006.01)

(52) U.S. Cl.
CPC ...... *G06K 19/0723* (2013.01); *G06K 19/07703* (2013.01)

(58) Field of Classification Search
CPC .......... G06F 17/2288; G06F 17/30011; G06F 21/572; G06F 2221/2141; G06T 1/60; G09G 5/00; H04Q 1/138; H04Q 2209/47
USPC ........................................................ 340/644
See application file for complete search history.

(56) References Cited

U.S. PATENT DOCUMENTS

| | | | | |
|---|---|---|---|---|
| 4,769,640 A * | 9/1988 | Sato | ............................... | 345/574 |
| 5,202,922 A * | 4/1993 | Iijima | ............................. | 380/45 |
| 5,418,353 A * | 5/1995 | Katayama et al. | ............. | 235/380 |
| 5,887,176 A * | 3/1999 | Griffith et al. | ................. | 713/320 |
| 6,019,284 A * | 2/2000 | Freeman et al. | .............. | 235/380 |
| 6,116,506 A * | 9/2000 | Matsumoto et al. | ........ | 235/382.5 |
| 6,402,039 B1 * | 6/2002 | Freeman et al. | .............. | 235/492 |
| 6,715,068 B1 * | 3/2004 | Abe | .................................. | 713/1 |
| 7,319,394 B2 * | 1/2008 | Sheller | ........................ | 340/572.1 |
| 7,659,834 B2 * | 2/2010 | Young et al. | ................ | 340/12.51 |
| 2002/0033829 A1 * | 3/2002 | Ohmori et al. | ................. | 345/552 |
| 2002/0116343 A1 * | 8/2002 | Nakamura et al. | .............. | 705/65 |
| 2003/0061110 A1 * | 3/2003 | Bodin | ............................ | 705/26 |
| 2004/0025021 A1 * | 2/2004 | Aikawa et al. | ................. | 713/172 |
| 2004/0072592 A1 * | 4/2004 | Hasegawa | ..................... | 455/558 |

(Continued)

OTHER PUBLICATIONS http://ww1.microchip.com/downloads/en/devicedoc/21299e.pdf.*

*Primary Examiner* — David Zarka
*Assistant Examiner* — Phong Nguyen
(74) *Attorney, Agent, or Firm* — Oblon, McClelland, Maier & Neustadt, L.L.P.

(57) ABSTRACT

A detecting section which detects a carrier wave near the receiving section, a switching control section which controls a switching section so as to, when the detecting section detects the carrier wave, switch connecting destination of the first storage section into the receiving section, and when the detecting section does not detect the carrier wave, switch the connecting destination of the first storage section into the reading section, a second storage section which stores the data conversion information read by the reading section, and a display control section which converts the read display data using the data conversion information stored in the second storage section so as to display the information on the display section are provided.

16 Claims, 9 Drawing Sheets

(56) References Cited

U.S. PATENT DOCUMENTS

| | | | |
|---|---|---|---|
| 2005/0122221 A1* | 6/2005 | Chuang et al. | 340/571 |
| 2005/0218218 A1* | 10/2005 | Koster | 235/383 |
| 2007/0067449 A1* | 3/2007 | Malkin et al. | 709/224 |
| 2007/0084920 A1* | 4/2007 | Slatter et al. | 235/436 |
| 2007/0200680 A1* | 8/2007 | Colby | 340/10.51 |
| 2007/0216668 A1* | 9/2007 | Miyamoto et al. | 345/204 |
| 2008/0055049 A1* | 3/2008 | Weill et al. | 340/10.31 |
| 2008/0094215 A1* | 4/2008 | Amador et al. | 340/572.1 |
| 2008/0157925 A1* | 7/2008 | Batra | 340/10.1 |
| 2008/0244554 A1* | 10/2008 | Kadashevich | 717/168 |

\* cited by examiner

| STATION CODE | STATION NAME CHINESE CHARACTER CODE STRING |
|---|---|
| 0001 | TOKYO |
| 0002 | SHINAGAWA |
| 0003 | YOKOHAMA |
| ⋮ | ⋮ |

FIG.9B

| TRAIN CODE | TRAIN CHINESE CHARACTER CODE STRING |
|---|---|
| 0001 | NOZOMI |
| 0002 | HIKARI |
| 0003 | KODAMA |
| ⋮ | ⋮ |

INFORMATION PROCESSING APPARATUS, INFORMATION PROCESSING SYSTEM, INFORMATION PROCESSING METHOD AND PROGRAM

CROSS-REFERENCE TO RELATED APPLICATION

The present invention contains subject matter related to Japanese Patent Application JP 2008-29739 filed in the Japan Patent Office on Feb. 8, 2008, the entire contents of which being incorporated herein by reference.

BACKGROUND OF THE INVENTION

1. Field of the Invention

The present invention relates to information processing apparatus, information processing system, information processing method and program.

2. Description of the Related Art

Non-contact IC cards contain an integrated circuit (IC chip) and an antenna, and can carry out near field wireless communication with another device (for example, reader/writer). Since the non-contact IC cards are portable and have high reliability, they are mostly used for authenticating or clearing up ID cards, credit cards or point cards and the like.

In recent years, it is considered that a display device is provided to surfaces of the non-contact IC cards. The display devices display information stored in IC chips, such as ID information, balance information or history information. As a result, convenience for using cards is improved. For example, Japanese Patent Application Laid-Open No. 2006-208582 discloses a technique that a display device is provided to the surface of the non-contact IC cards.

IC chips included in non-contact IC cards used generally at the present do not have a display function corresponding to the display devices. For this reason, in order to provide the display device to the non-contact IC cards, the existing IC chips can be hardly directly diverted. Therefore, it is considered that new IC chips having the display function are developed. However, the development of new IC chips costs a lot, and it is difficult to spread new IC chips instead of already spread IC chips.

Therefore, in order to realize a non-contact IC card provided with a display device, the non-contact IC card is provided with an IC chip of existing non-contact IC cards, a display device, and a control IC which can control the display device. The control IC reads information stored in the IC chip, and displays the read information on the display device. According to this method, the existing technique is used so that the non-contact IC card having the display device can be realized.

At this time, data to be displayed on the display device of the non-contact IC card should be read from a reader/writer via the IC chip. It is difficult to store large-capacity data for display in existing IC chips, and the data should be transferred to the control IC for the display device immediately. In view of convenience of the non-contact IC card, since a memory capacity is repressed and simultaneously communication time is shortened, the data capacity of the display data should be reduced.

SUMMARY OF THE INVENTION

In order to solve the above issue, it is desirable to provide new and improved information processing apparatus, information processing system, information processing method and program which can store display data efficiently.

According to an embodiment of the present invention, there is provided an information processing apparatus including: a receiving section which receives a magnetic field signal; a first storage section which stores display data contained in the magnetic field signal and data conversion information for converting the display data into information displayable on a display section therein; a reading section which reads the display data and the data conversion information stored in the first storage section; a detecting section which detects a carrier wave near the receiving section; a switching control section which controls a switching section so as to, when the detecting section detects the carrier wave, switch connecting destination of the first storage section into the receiving section, and when the detecting section does not detect the carrier wave, switch the connecting destination of the first storage section into the reading section; a second storage section which stores the data conversion information read by the reading section; and a display control section which converts the read display data using the data conversion information stored in the second storage section, so as to display the information on the display section.

When the data conversion information contained in the magnetic field signal received by the receiving section is updated from the data conversion information already stored in the second storage section, the reading section reads the data conversion information stored in the first storage section, and the second storage section may update the data conversion information already stored into updated data conversion information.

Furthermore, according to another embodiment of the present invention, there is provided an information processing system including: a first device which receives data via wireless communication and stores the data therein; and a second device which transmits/receives the data to/from the first device, wherein the first device includes: a receiving section which receives a magnetic field signal; a first storage section which stores display data contained in the magnetic field signal and data conversion information for converting the display data into information displayable on a display section therein; a reading section which reads the display data and the data conversion information stored in the first storage section; a detecting section which detects a carrier wave near the receiving section; a switching control section which controls a switching section so as to, when the detecting section detects the carrier wave, switch connecting destination of the first storage section into the receiving section, and when the detecting section does not detect the carrier wave, switch the connecting destination of the first storage section into the reading section; a second storage section which stores the data conversion information read by the reading section therein; and a display control section which converts the read display data using the data conversion information stored in the second storage section, so as to display the information on the display section, the second device starts or interrupts transmission of a carrier wave at any timing.

Furthermore, according to another embodiment of the present invention, there is provided an information processing method including the steps of: receiving a magnetic field signal by means of a receiving section; storing display data contained in the magnetic field signal and data conversion information for converting the display data into information displayable on a display section in a first storage section; reading the display data and the data conversion information stored in the first storage section; detecting a carrier wave near the receiving section; controlling a switching section so that when the carrier wave is detected, connecting destination of the first storage section is switched into the receiving section, and when the carrier wave is not detected, the connecting destination of the first storage section is switched into a reading section; storing the read data conversion information in a second storage section; and converting the read display data using the data conversion information stored in the second storage section and displaying the information on a display section.

Furthermore, according to another embodiment of the present invention, there is provided a program which allows a computer to function as: a unit which receives a magnetic field signal by means of a receiving section; a unit which stores display data contained in the magnetic field signal and data conversion information for converting the display data into information displayable on a display section in a first storage section; a unit which reads the display data and the data conversion information stored in the first storage section; a unit which detects a carrier wave near the receiving section; a unit which controls a switching section so that when the carrier wave is detected, connecting destination of the first storage section is switched into the receiving section, and when the carrier wave is not detected, the connecting destination of the first storage section is switched into a reading section; a unit which stores the read data conversion information in a second storage section; and a unit which converts the read display data using the data conversion information stored in the second storage section and displays the information on the display section.

According to the present invention, the display data can be stored efficiently.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A non-contact IC card 100 (first device) is used for tickets or the like to be used in railway companies. The non-contact IC card 100 receives data from a reader/writer 10 (second device) and stores the received data therein. The non-contact IC card 100 has a display section 130 and can display the stored data to an outside. The data acquired by the non-contact IC card 100 includes information relating to a reserved-seat ticket (display data), data conversion table (data conversion information) and the like.

Figure 9A:
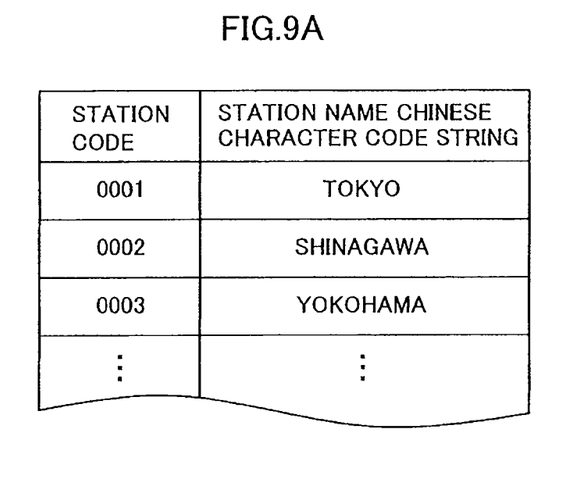
FIGS. 9A and 9B are explanatory diagrams illustrating data conversion tables stored in a storage section of a display control section.
Figure 9B:
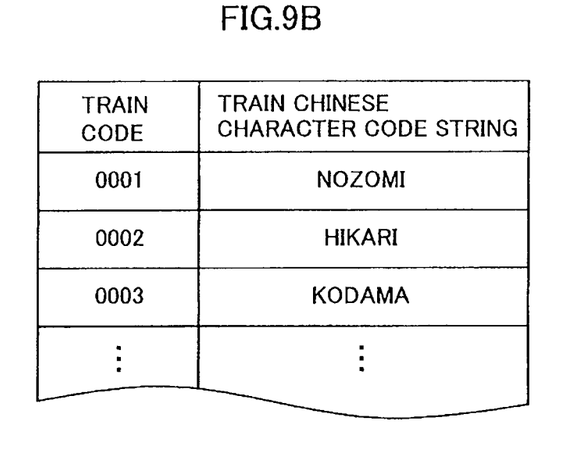

The data conversion table stored in a storage section 125 of a display control section 120 is described with reference to FIGS. 9A and 9B. FIGS. 9A and 9B are explanatory diagrams illustrating the data conversion tables stored in the storage section 125 of the display control section 120.

The data conversion table is a table for converting codes into characters which can be displayed on the display section 130. The data conversion table includes a data conversion table for converting station codes into station names as shown in FIG. 9A, and a data conversion table for converting train codes into train names as shown in FIG. 9B.

A total data amount of the data to be transmitted from the reader/writer 10 to the non-contact IC card 100 can be reduced by using the data conversion table. This is described in detail below.

When information about a reserved-seat ticket is displayed on the display section 130, information necessary for the display includes information about a departure station, an arrival station, a departure date, an arrival date, a train name, a seat number, a publication date, an expiration date and money amount. These pieces of information may be transmitted as bit map type image data, but the data amount becomes enormous.

For this reason, predetermined station codes and train codes are used, and the data conversion tables shown in FIGS. 9A and 9B are stored in the storage section 125 of the display control section 120. As a result, the non-contact IC card 100 can receive necessary information with less data amount from the reader/writer 10.

The data conversion tables stored in the storage section 125 of the display control section 120 should be updated when station names and train names are added or changed. Since the display control section 120 does not have a communication unit, the data conversion tables should be updated via a non-contact IC card section 110. Therefore, the updated data in the data conversion tables is received from the reader/writer 10, and in the case of a new table data, the table data in the storage section 125 is updated as described below.

Structure According to One Embodiment

Figure 1:
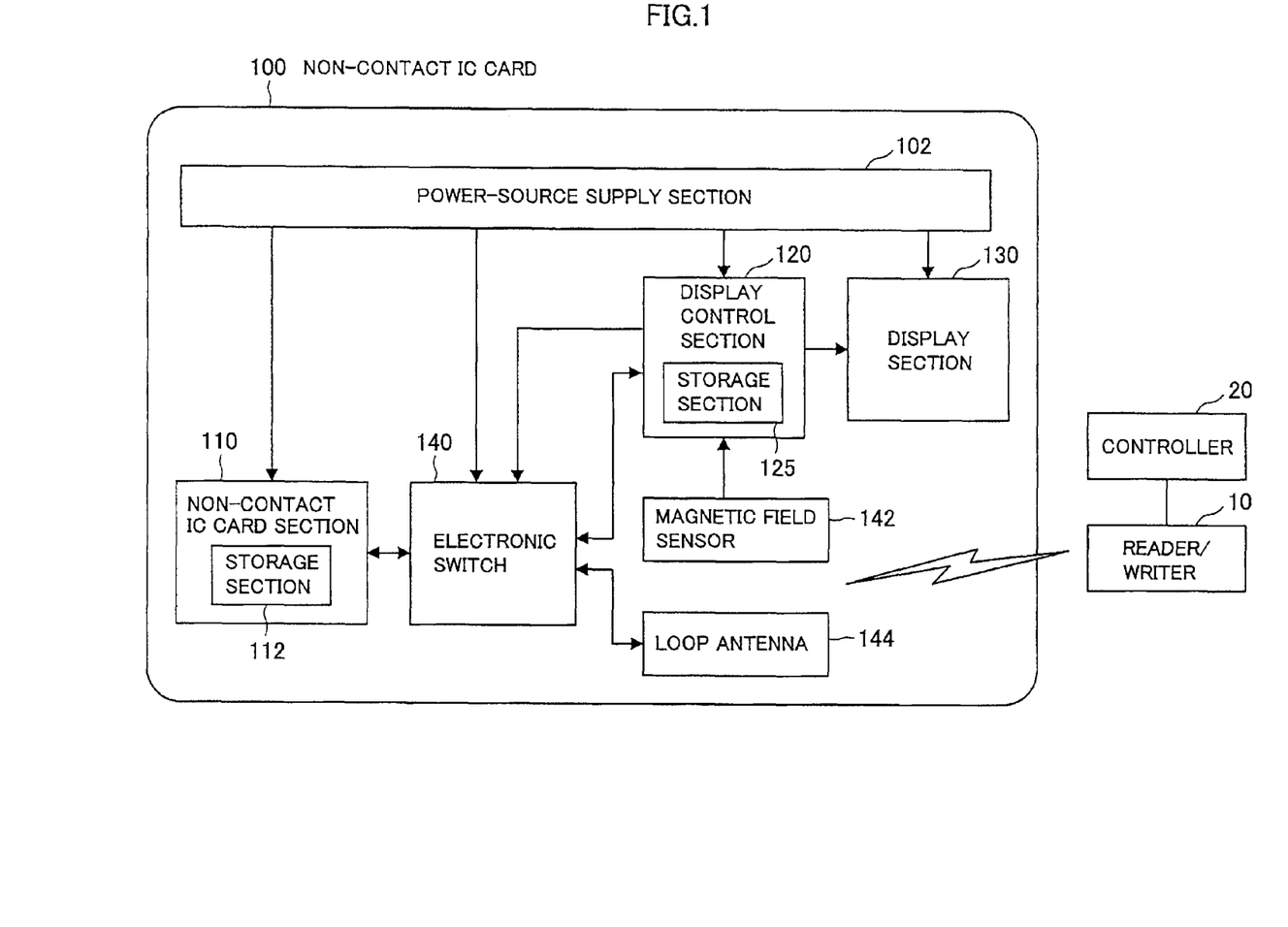
FIG. 1 is a block diagram illustrating a non-contact IC card according to one embodiment of the present invention.

The non-contact IC card 100 according to one embodiment of the present invention is described with reference to FIG. 1. FIG. 1 is a block diagram illustrating the non-contact IC card 100 according to the embodiment.

The non-contact IC card 100 according to the embodiment includes a power source supply section 102, the non-contact IC card section 110, the display control section 120, the display section 130, the electron switch 140, a magnetic field sensor 142, and a loop antenna 144.

The power source supply section 102 supplies an electric power to respective structural elements contained in the non-contact IC card 100, such as the non-contact IC card section 110, the display control section 120, the display section 130 and the electron switch 140. An electric power is supplied to the non-contact IC card section 110, but the non-contact IC card 100 according to the embodiment shown in FIG. 1 is not limited to this example. For example, the electric power may be supplied to the non-contact IC card section 110 by a signal to be supplied from the reader/writer 10. At this time, the power source supply section 102 does not supply an electric power to the non-contact IC card section 110 but supplies an electric power to the display control section 120, the display section 130 and the electron switch 140.

The non-contact IC card section 110 executes a control process and an arithmetic process for realizing the functions as the non-contact IC card 100. The non-contact IC card section 110 is provided as a semiconductor integrated circuit (IC chip) to the inside of the non-contact IC card 100.

The non-contact IC card section 110 has a storage section 112 (first storage section). The storage section 112 is, for example, EEPROM (Electronically Erasable and Programmable Read Only Memory). The non-contact IC card section 110 receives information contained in a signal transmitted from the reader/writer via the loop antenna 144, and the storage section 112 stores the information therein.

The non-contact IC card section 110 reads the information stored in the storage section 112 based on a request from the reader/writer 10 or the display control section 120, and transmits the information to the reader/writer 10 or the display control section 120.

The information to be stored in the storage section 112 is, for example, data about a ticket and a data conversion information.

The display control section 120 controls display on the display section 130. The display control section 120 acquires information stored in the storage section 112 from the non-contact IC card section 110 via the electron switch 140, and displays that information or information generated based on the information on the display section 130. The display control section 120 is one example of a reading section.

The display control section 120 controls the electron switch 140 based on a detected result of a magnetic field supplied from the magnetic field sensor 142. For example, when the magnetic field sensor 142 detects a carrier wave, the display control section 120 controls the electron switch 140 so that a connecting destination of the non-contact IC card section 110 is switched into the loop antenna 144. This control enables communication between the non-contact IC card 100 and the reader/writer 10. On the other hand, since the display control section 120 is disconnected from the non-contact IC card section 110, it can hardly acquire information from the non-contact IC card section 110.

When the magnetic field sensor 142 does not detect the carrier wave, the display control section 120 controls to switch the connecting destination of the non-contact IC card section 110 into the display control section 120. This control disables the communication between the non-contact IC card 100 and the reader/writer 10. On the other hand, since the display control section is connected to the non-contact IC card section 110, it can acquire information from the non-contact IC card section 110. The display control section 120 is one example of a switching control section.

The display control section 120 has the storage section 125 (second storage section). The storage section 125 is, for example, EEPROM (Electronically Erasable and Programmable Read Only Memory). The display control section 120 receives information from the non-contact IC card section 110 and the storage section 125 stores the information therein. As a result, the display control section 120 can display the information acquired from the non-contact IC card section 110 on the display section 130 at any timing.

The display section 130 is, for example, LCD (Liquid Crystal Display) and organic EL (Electro-Luminescence) display, and can display characters and images. The display section 130 may have a shape and a size such that convenience as the non-contact IC card 100 can be provided.

The electron switch 140 is one example of a switching section, and a switching circuit which switches a connecting destination of a signal input/output terminal of the non-contact IC card section 110. The electron switch 140 is, for example, a three-terminal switch, and connects the non-contact IC card section 110 to any one of the loop antenna 144 or the display control section 120. The electron switch 140 is controlled by the display control section 120. The electron switch 140 may have any structure and scale such that convenience as the non-contact IC card 100 can be provided.

The magnetic field sensor 142 is one example of a detecting section, and is provided near the loop antenna 144. The magnetic field sensor 142 detects a change in a magnetic field generated near the loop antenna 144. The magnetic field sensor 142 transmits the detected result to the display control section 120. The magnetic field sensor 142 is for detecting a magnetic field signal transmitted from the reader/writer 10, and its detecting ability for a change in the magnetic field may be approximated or matched with the loop antenna 144. For example, the magnetic field sensor 142 has a coil shape which is similar to that of the loop antenna 144, and is disposed to be insulated from and superimposed on the loop antenna 144.

The loop antenna 144 is one example of a receiving section, and receives a magnetic field signal. The loop antenna 144 detects and receives a change in a magnetic field inside the loop due to an electromagnetic wave (carrier wave) transmitted from the reader/writer 10 close to the non-contact IC card 100. The loop antenna 144 transmits the received signal to the non-contact IC card section 110 via the electron switch 140.

Figure 2:
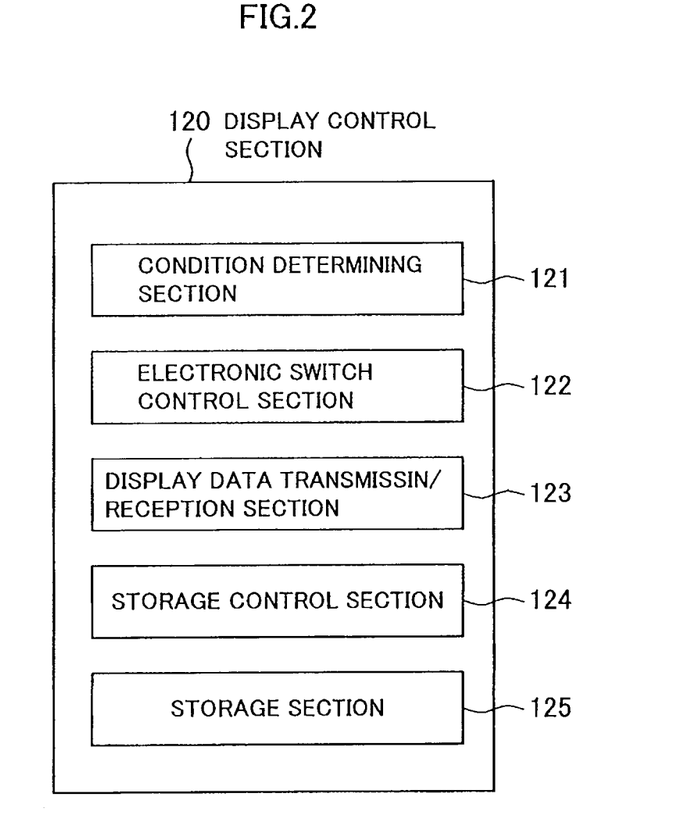
FIG. 2 is a block diagram illustrating a display control section of the non-contact IC card according to the embodiment.

The display control section 120 according to the embodiment is described in detail below with reference to FIG. 2. FIG. 2 is a block diagram illustrating the display control section 120 of the non-contact IC card 100 according to the embodiment.

The display control section 120 includes a condition determining section 121, an electron switch control section 122, a display data transmission/reception section 123, a storage control section 124 and the storage section 125.

The condition determining section 121 determines whether the result detected by the magnetic field sensor 142 satisfies a predetermined condition. For example, the predetermined condition is presence/non-presence of detection of the change in a magnetic field. When the change in the magnetic field is detected, the determination is made that the condition is satisfied. When the change in the magnetic field is not detected, the condition is not satisfied.

The electron switch control section 122 controls the electron switch 140 according to the determined result of the condition determining section 121. For example, when the condition determining section 121 detects a carrier wave and determines that condition is satisfied, the electron switch control section 122 controls the electron switch 140 so that the connecting destination of the non-contact IC card section 110 is switched into the loop antenna 144. On the other hand, when the condition determining section 121 does not detect a carrier wave and determines that the condition is not satisfied, the electron switch control section 122 controls the electron switch 140 so that the connecting destination of the non-contact IC card section 110 is switched into the display control section 120.

The display data transmission/reception section 123 receives information such as display data or data conversion information from the non-contact IC card section 110 via the electron switch 140 so as to transmit information for display to the display section 130.

The storage control section 124 makes a control so that the information such as display data or data conversion information is written into the storage section 125 or the information such as display data or data conversion information stored in the storage section 125 is read.

The series of processes may be executed by hardware or software using a program on a computer.

Operation According to One Embodiment

An operation of the non-contact IC card 100 according to the embodiment is described below with reference to FIGS. 3 to 7.

Figure 3:
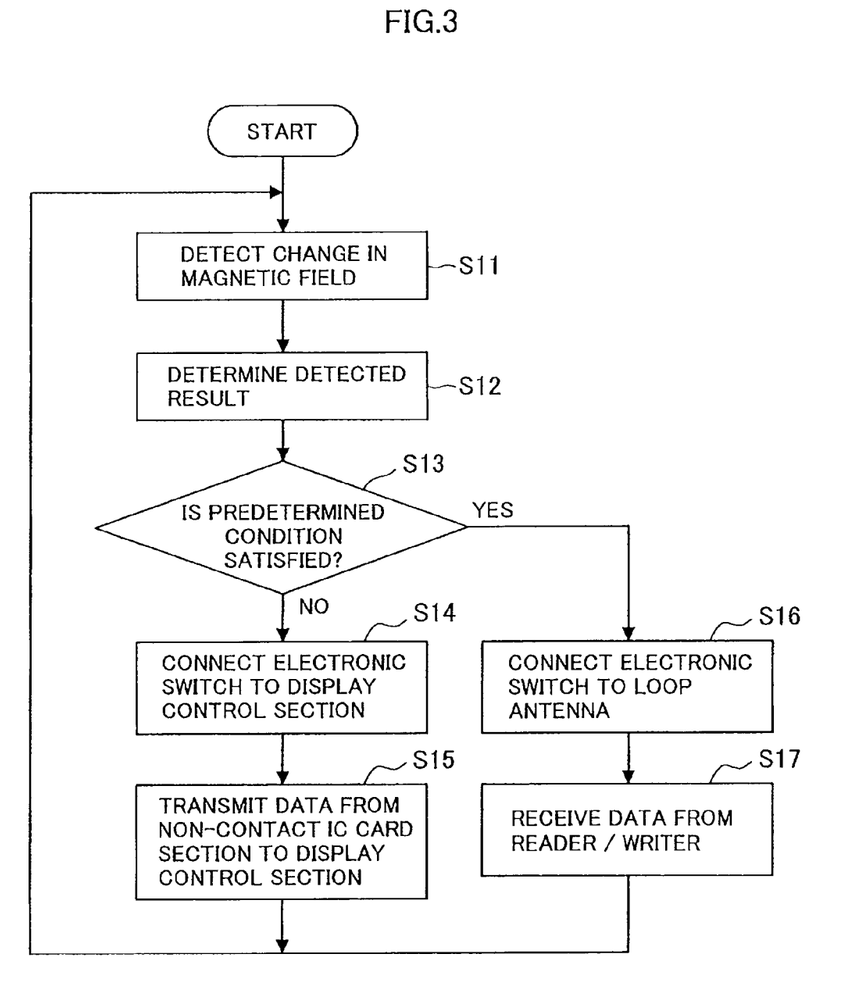
FIG. 3 is a flow chart illustrating switching of an electron switch.

Switching of the electron switch 140 is described with reference to FIG. 3. FIG. 3 is a flow chart illustrating the switching of the electron switch 140. Normally the non-contact IC card 100 is approximated to the reader/writer 10 so as to detect a change in a magnetic field, and accordingly the electron switch 140 switches connecting destination.

The magnetic field sensor 142 contained in the non-contact IC card 100 detects a change in a magnetic field (step S11). The condition determining section 121 of the display control section 120 determines whether the predetermined condition is satisfied (steps S12 and S13). When the predetermined condition is satisfied, for example, when a carrier wave from the reader/writer 10 is detected, the electron switch 142 of the display control section 120 is connected to the loop antenna 144 (step S16). At this time, the non-contact IC card 100 can receive data from the reader/writer 10 (step S17). The storage section 112 of the non-contact IC card section 110 stores the received data therein.

On the other hand, when the predetermined condition is not satisfied, for example, when the carrier wave from the reader/writer 10 is not detected, the electron switch 142 of the display control section 120 is connected to the display control section 120 (step S14). At this time, the non-contact IC card 100 can transmit data from the non-contact IC card section 110 to the display control section 120 (step S15). The storage section 125 of the display control section 120 stores the data from the non-contact IC card section 110.

The switching of the electron switch 140 is changed according to presence/non-presence of the detection of the carrier wave, and the non-contact IC card 100 receives the data from the reader/writer 10 or transmits the data stored in the non-contact IC card section 110 to the display control section 120. As a result, while the existing non-contact IC card section 110 is being utilized, the data is transmitted to the display control section 120 and information can be displayed on the display section 120.

Figure 4:
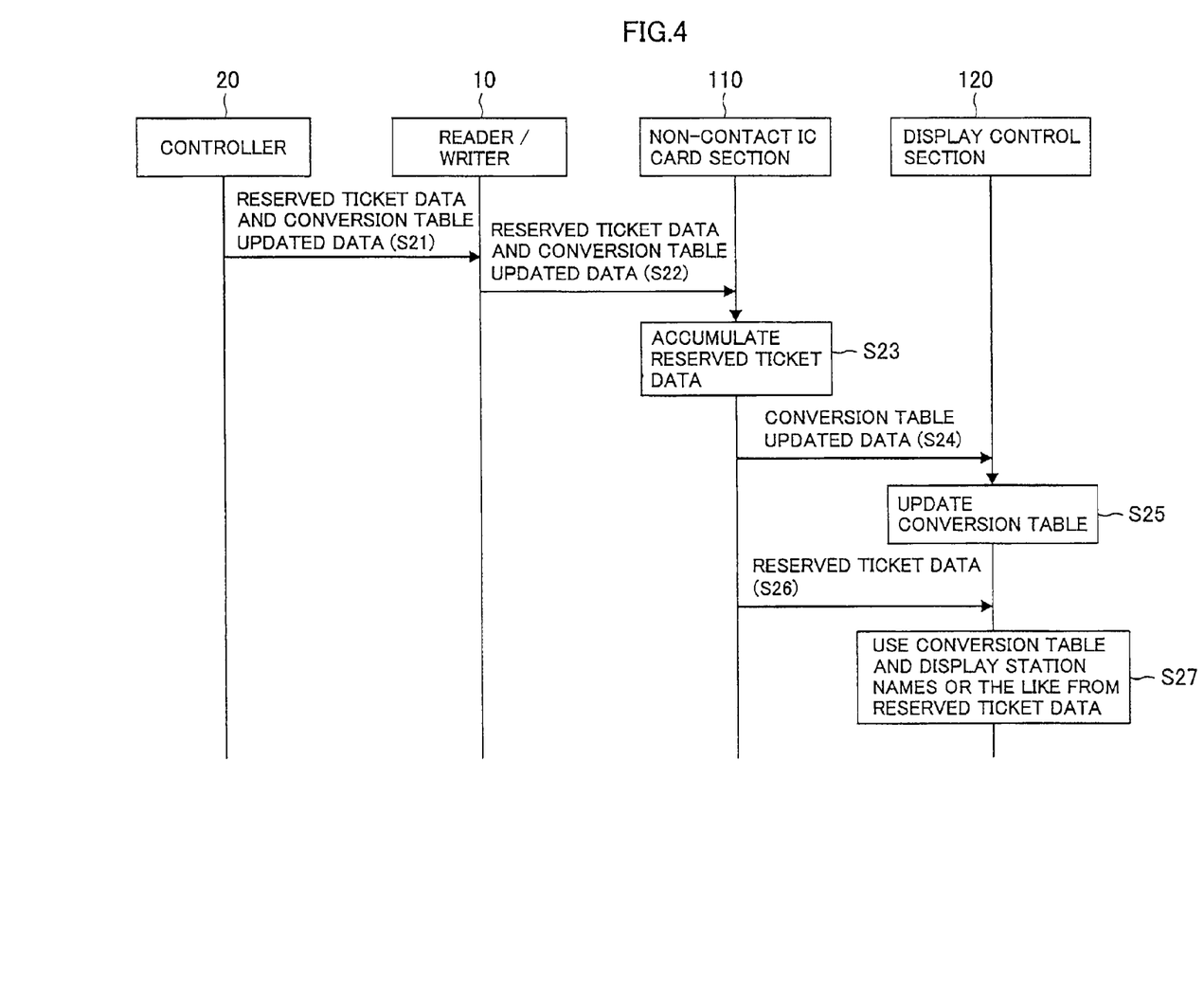
FIG. 4 is a flow chart illustrating a flow of data to be transmitted from a reader/writer to the non-contact IC card.

The flow of the data to be transmitted from the reader/writer 10 to the non-contact IC card 100 is described below with reference to FIG. 4. FIG. 4 is a flow chart illustrating the flow of the data to be transmitted from the reader/writer 10 to the non-contact IC card 100.

The reader/writer 10 receives data from the controller 20 (a computer server apparatus or a computer terminal) connected to the reader/writer 10 (step S21). When the non-contact IC card 100 according to the embodiment is used as a ticket or a reserved-seat ticket of a railway company, the reader/writer 10 receives reserved-seat ticket data or conversion table updated data from the controller 20.

When the non-contact IC card 100 is approximated to the reader/writer 10 and detects a carrier wave, the electron switch 140 of the non-contact IC card 100 is connected to the loop antenna 144 like step S16 in FIG. 1. The non-contact IC card 100 receives the reserved-seat ticket data or the conversion table updated data from the reader/writer 10 (step S22). The reserved-seat ticket data received from the reader/writer 10 is stored in the storage section 112 of the non-contact IC card section 110 (step S23).

On the other hand, as to the conversion table updated data received from the reader/writer 10, a version of the data conversion table (old or new data) stored in the storage section 125 of the display control section 120 is determined. When the conversion table updated data is newer than the data conversion table stored in the storage section 125, the display control section 120 reads the conversion table updated data (step S24). This reading is carried out when the carrier wave is not detected, and the electron switch 140 of the non-contact IC card 100 is connected to the display control section 120 like step S14. The data conversion table stored in the storage section 125 is updated (step S25).

When the reserved-seat ticket data is displayed on the display section 130, the display control section 120 reads the reserved-seat ticket data stored in the storage section 112 of the non-contact IC card section 110 (step S26). The display control section 120 converts a station name and a train name into displayable data according to the reserved-seat ticket data by using the data conversion table stored in the storage section 125, and displays the data on the display section 130 (step S27).

The reserved-seat ticket data and the conversion table updated data are transmitted from the reader/writer 10 to the non-contact IC card 100, so that the data about the reserved-seat ticket can be displayed on the display section 130 of the non-contact IC card 100.

Figure 5:
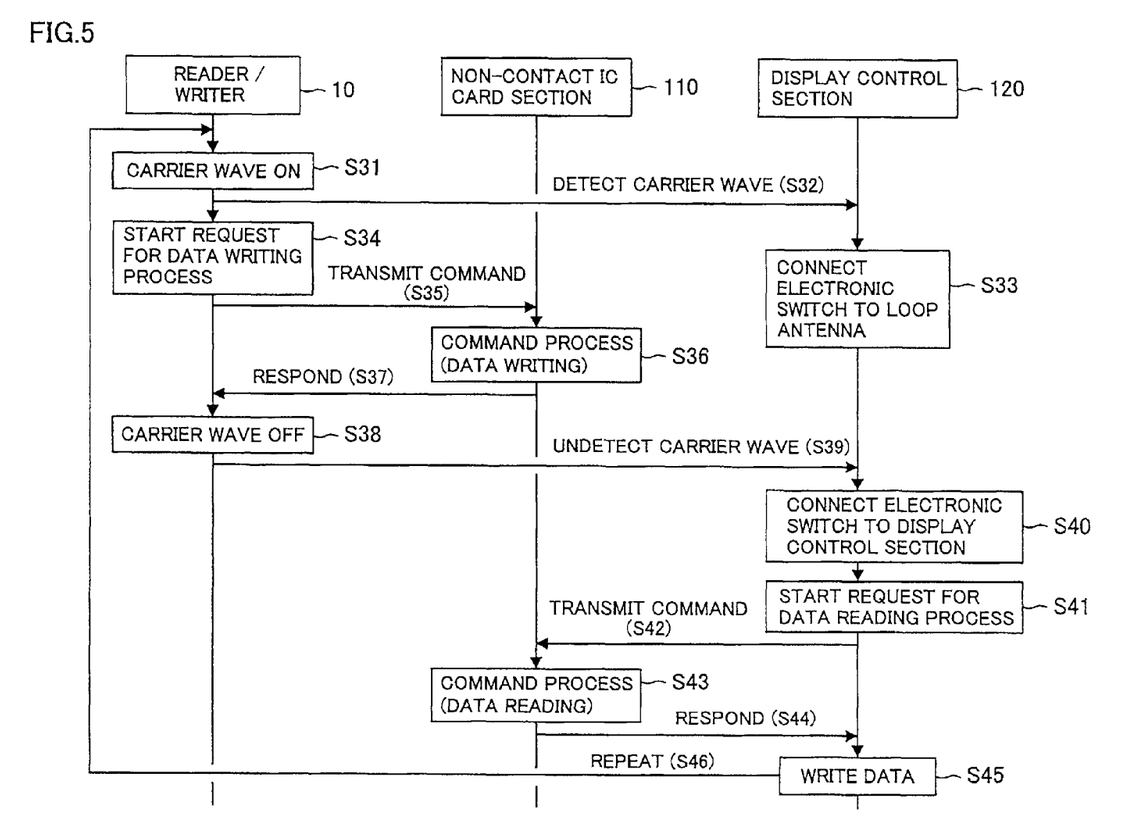
FIG. 5 is a flow chart illustrating a command process at the time of transmitting data to the non-contact IC card from the reader/writer.

A command process at the time of transmitting data from the reader/writer 10 to the non-contact IC card 100 is described below with reference to FIG. 5. FIG. 5 is a flow chart illustrating the command process at the time of transmitting data from the reader/writer 10 to the non-contact IC card 100.

The reader/writer 10 transmits a carrier wave to the non-contact IC card 100 (step S31). When the non-contact IC card 100 is approximated to the reader/writer 10, a determination is made that the carrier wave is detected in the display control section 120 (step S32). As a result, the display control section 120 controls the electron switch 140 so as to connect the electron switch 140 to the loop antenna 144 (step S33). In this state, the non-contact IC card section 110 can receive the data from the reader/writer 10.

The reader/writer 10 starts to request the non-contact IC card section 110 for a data writing process (step S34), and transmits a data writing command to the non-contact IC card section 110 (step S35). The non-contact IC card section 110 responds to the reader/writer as to the data writing (step S37). The non-contact IC card section 110 which receives the data writing command executes the command process (step S36). As a result, data such as the reserved-seat ticket data or the conversion table updated data is written into the non-contact IC card section 110.

For example, when a data capacity of the conversion table updated data is large, it is difficult to write the entire data into the non-contact IC card section 110 at a time. Therefore, when reception of a part of data is completed, the reception of the data from the reader/writer is once stopped, and the data stored in the storage section 112 of the non-contact IC card section 110 may be transferred to the storage section 125 of the display control section 120.

Namely, after the reader/writer 10 receives a response of step S37 from the non-contact IC card section 110, the transmission of the carrier wave is interrupted (step S38). As a result, the non-contact IC card 100 determines that the carrier wave is not detected in the display control section 120 (step S39). As a result, the display control section 120 controls the electron switch 140 so as to connect the electron switch 140 to the display control section 120 (step S40). In this state, the non-contact IC card section 110 can transmit data to the display control section 120.

Figures 8A, 8B:
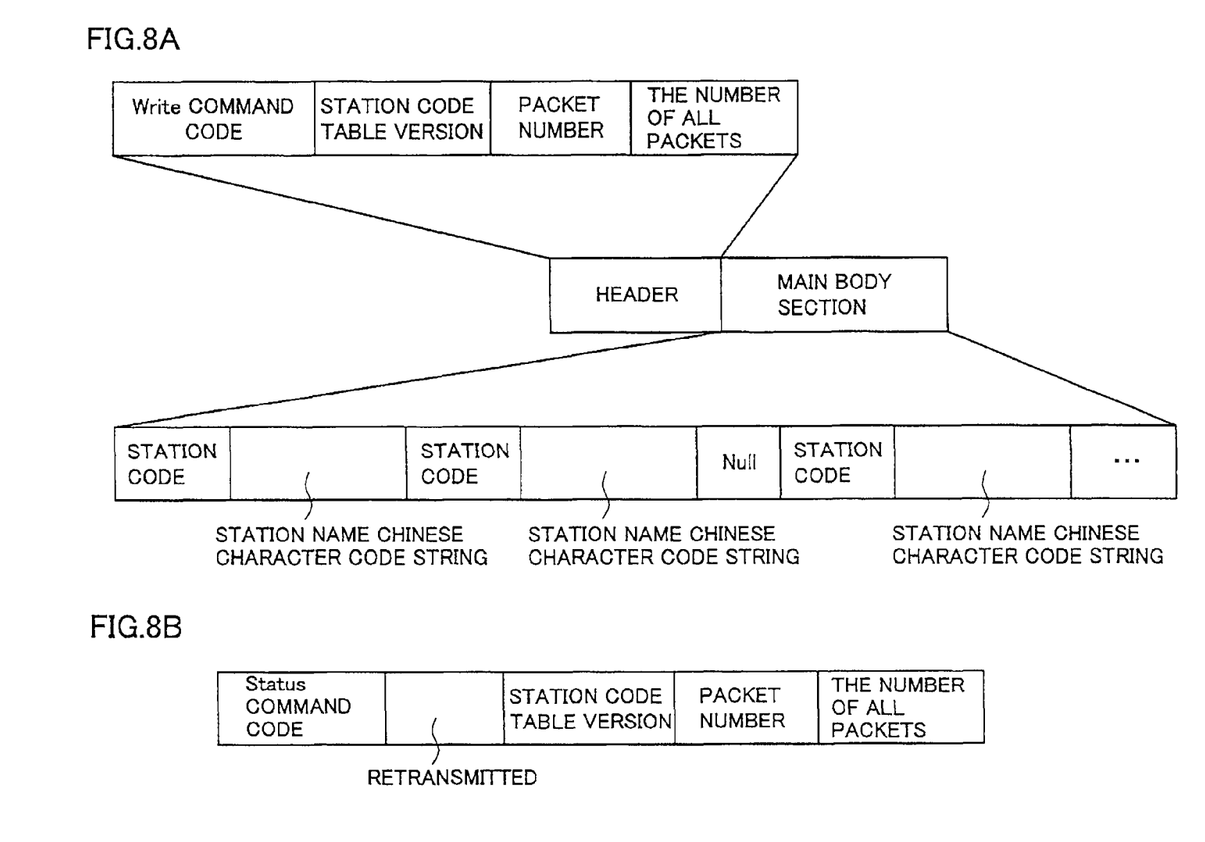
FIGS. 8A and 8B are explanatory diagrams illustrating data structures of packet data.

The display control section 120 starts to request the non-contact IC card section 110 for the data reading process (step S41), and transmits the data reading command to the non-contact IC card section 110 (step S42). The non-contact IC card section 110 which receives the data reading command executes the command process (step S43). As a result, data is read from the storage section 112 of the non-contact IC card section 110, and the non-contact IC card section 110 responds to the display control section 120 (step S44). Data such as the reserved-seat ticket data or the conversion table updated data is written into the display control section 120 (step S45). At this time, packet data shown in FIG. 8A is transmitted from the non-contact IC card section 110 to the display control section 120. FIG. 8A is an explanatory diagram illustrating a data structure of the packet data.

Thereafter, the reader/writer 10 again transmits the carrier wave to the non-contact IC card section 110, and writes continued data after data recorded partway in the non-contact IC card section 110. When steps 31 to S45 are repeated, the writing of the conversion table updated data of a large data capacity into the display control section 120 is completed (step S46).

When the reader/writer 10 interrupts the transmission of the carrier wave, the data is transmitted from the storage section 112 of the non-contact IC card section 110 to the storage section 125 of the display control section 120. For this reason, data of large amount can be stored in the display control section 120 via the non-contact IC card section 110 without enlarging a memory capacity of the storage section 112 of the non-contact IC card section 110. As a result, even when the exiting non-contact IC card section 110 is used, the data of large capacity can be received.

Figure 6:
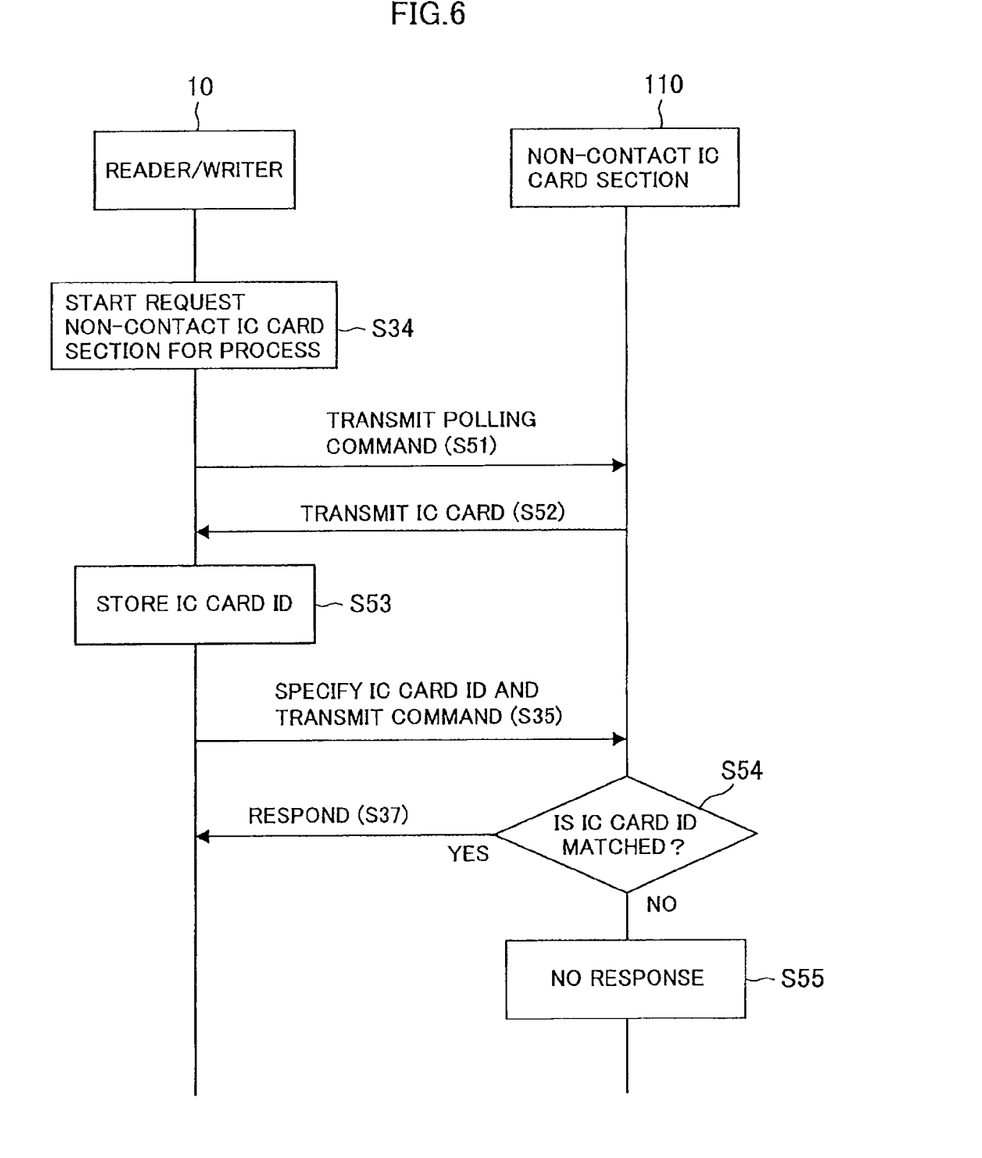
FIG. 6 is a flow chart illustrating a data process at the time of transmitting a command to the non-contact IC card section by the reader/writer.

A data process at the time of transmitting a command from the reader/writer 10 to the non-contact IC card section 110 is described in detail below with reference to FIG. 6. FIG. 6 is a flow chart illustrating the data process at the time of transmitting a command from the reader/writer 10 to the non-contact IC card section 110.

Like step S34 in FIG. 5, when the reader/writer 10 requests the non-contact IC card section 110 to execute a writing process, the reader/writer 10 transmits a polling command to the non-contact IC card section 110 (step S51). On the contrary, the non-contact IC card section 110 transmits ID (identification information) specific to the non-contact IC card section 110 to the reader/writer 10 (step S52).

The reader/writer 10 stores the received ID specific to the non-contact IC card section 110 (step S53). The reader/writer 10 specifies the received ID specific to the non-contact IC card section 110 and transmits a command (step S35). When the non-contact IC card section 110 receives the command, it determines whether the ID of the non-contact IC card attached to the command agrees with self specific ID (step S54). When they match with each other, the non-contact IC card section 110 responds to the reader/writer 10 (step S37), and executes the command process such as the writing process. On the other hand, when they do not agree with each other, the non-contact IC card section 110 does not respond to the reader/writer 10 (step S55).

As a result, even when a plurality of commands is transmitted from the reader/writer 10, the non-contact IC card section 110 may respond only to a command specified by the self ID. As a result, the non-contact IC card 100 can securely execute the command process.

When the reader/writer 10 corresponds one-to-one with the non-contact IC card section 110, for example, when the non-contact IC card 100 is inserted into a ticket-vending machine which exchanges information only with one non-contact IC card 100, after a polling command is transmitted at the first time, the polling command for specifying the non-contact IC card 100 does not have to be transmitted each time. That is to say, as shown in FIG. 5, in the case where the transmission of a carrier wave is started or interrupted, when the command at step S35 is transmitted, the polling command may be transmitted only at the first time. When the writing of data is repeated at step S46, essentially the polling command should be transmitted each time. However, since the reader/writer 10 continuously executes a process on the one non-contact IC card section 110, it can execute the command process at step S35 without transmitting the polling command.

According to the above description, when the data of large data amount is stored in the display control section 120 via the non-contact IC card section 110, a procedure for transmitting the polling command can be omitted. For this reason, the data can be transmitted quickly.

Figure 7:
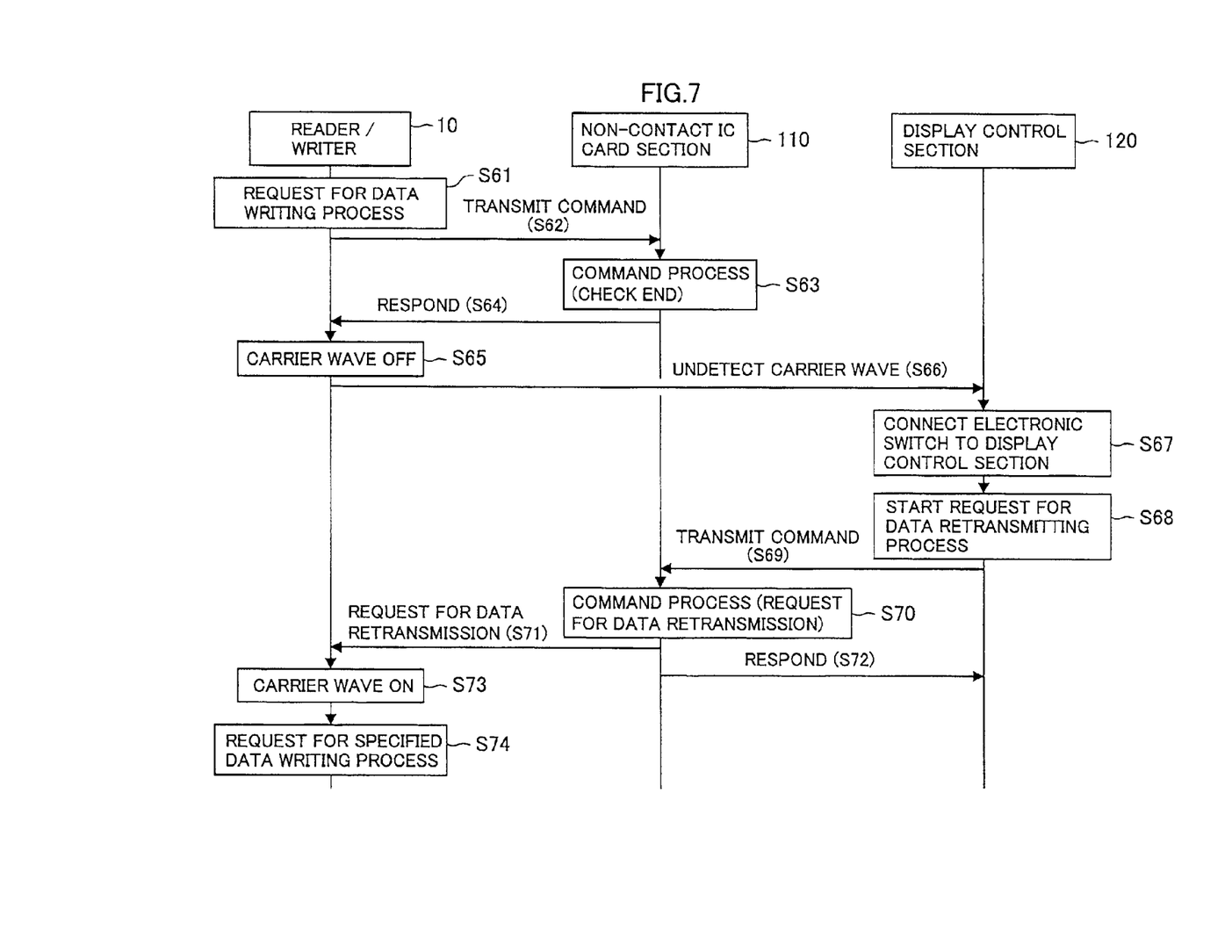
FIG. 7 is a flow chart illustrating a command process from the reader/writer to the non-contact IC card.

A process in the case where since the transmission/reception of the data is interrupted, only a part of data is stored in the display control section 120 is described below with reference to FIG. 7. FIG. 7 is a flow chart illustrating the command process from the reader/writer 10 to the non-contact IC card 100. At this time, the reader/writer 10 does not retransmits the data from the beginning to the display control section 120 but can transmit the data partway.

That is to say, the reader/writer 10 starts to request the non-contact IC card section 110 for the data writing process (step S61), and transmits the data writing command to the non-contact IC card section 110 (step S62). The non-contact IC card section 110 which receives the data writing command executes the command process (step S63). When the non-contact IC card section 110 responds to the reader/writer as to confirmation of the completion of the data writing (step S64), the reader/writer 10 stops the transmission of the carrier wave (step S65). As a result, the non-contact IC card 100 determines that the display control section 120 does not detect the carrier wave (step S66). As a result, the display control section 120 controls the electron switch 140 so as to connect the electron switch 140 to the display control section 120 (step S67).

When the display control section 120 determines that only a part of data is stored, it starts to request for a data retransmitting process (step S68). At this time, the display control section 120 transmits packet data shown in FIG. 8B to the non-contact IC card section 110. The non-contact IC card section 110 which receives the command transmits the data retransmission request to the reader/writer 10 (step S71), and responds to the display control section 120 (step S72).

The reader/writer 10 which receives the data retransmission request starts the transmission of the carrier wave (step S73). The reader/writer 10 requests the display control section 120 to execute the process for writing specified part of the data (step S74). Thereafter, the process is executed similarly to steps after step S34 shown in FIG. 5, and the writing of the entire data into the storage section 125 of the display control section 120 is completed.

It should be understood by those skilled in the art that various modifications, combinations, sub-combinations and alternations may occur depending on design requirements and other factors insofar as they are within the scope of the appended claims or the equivalents thereof.

What is claimed is:

1. An information processing apparatus comprising:
a receiving circuit which receives a magnetic field signal;
a first storage circuit which stores display data contained in the magnetic field signal and data conversion information associating the display data to predetermined displayable information;
a reading circuit which reads the display data and the data conversion information stored in the first storage circuit;
a second storage circuit which stores the data conversion information read by the reading circuit;
a switch to connect the first storage circuit to one of the receiving circuit and the reading circuit;
a detecting circuit which detects a carrier wave near the receiving circuit;
a display control circuit to
 cause the switch to connect the first storage circuit to the receiving circuit, when the detecting circuit detects the carrier wave,
 cause the switch to connect the first storage circuit to the reading circuit, when the detecting circuit does not detect the carrier wave, and
 to convert the display data, read from the first storage circuit by the reading circuit, by reading displayable information associated with the display data in the data conversion information stored in the second storage circuit;
a display to display the displayable information associated with the display data; and
a processing circuit to process information stored in the first storage circuit based on a command received by the receiving circuit via the carrier wave, when the command includes identification information identifying the information processing apparatus, the received command including version information of the data conversion information to be used by the processing circuit to process the information stored in the first storage circuit.

2. The information processing apparatus according to claim 1, wherein when the data conversion information contained in the magnetic field signal received by the receiving circuit is updated based on the data conversion information stored in the second storage circuit,
 the reading circuit reads the data conversion information stored in the first storage circuit, and
 the second storage circuit updates the data conversion information already stored into the updated data conversion information.

3. The information processing apparatus according to claim 1, wherein the receiving circuit is a loop antenna.

4. The information processing apparatus according to claim 3, wherein the detecting circuit detects the carrier wave by detecting an electromagnetic field.

5. The information processing apparatus according to claim 4 wherein the detecting circuit includes an antenna separate from the loop antenna.

6. The information processing apparatus according to claim 1, wherein at least a portion of the information processing apparatus is powered by the magnetic field signal.

7. The information processing apparatus according to claim 1, wherein the display is a liquid crystal display.

8. The information processing apparatus according to claim 1, wherein the information processing apparatus is a non-contact IC card.

9. The information processing apparatus according to claim 8, wherein the magnetic field signal further includes financial transaction data.

10. The information processing apparatus according to claim 1, wherein the data conversion information includes a table that stores codes in association with information displayable on the display, the display data corresponding to the codes.

11. The information processing apparatus according to claim 10, wherein the information displayable on the display include train station and train schedule information.

12. The information processing apparatus according to claim 1, wherein the processing circuit does not process the information stored in the first storage circuit when the command received by the receiving circuit does not include information identifying the information processing apparatus.

13. The information processing apparatus according to claim 1, wherein the switch is an electron switch.

14. An information processing system comprising:
a first device which receives data via wireless communication and stores the data therein; and
a second device which transmits/receives the data to/from the first device;
wherein the first device includes:
a receiving circuit which receives a magnetic field signal;
a first storage circuit which stores display data contained in the magnetic field signal and data conversion information associating the display data to predetermined displayable information;
a reading circuit which reads the display data and the data conversion information stored in the first storage circuit;
a second storage circuit which stores the data conversion information read by the reading circuit;
a switch to connect the first storage circuit to one of the receiving circuit and the reading circuit;
a detecting circuit which detects a carrier wave near the receiving circuit;
a display control circuit to
 cause the switch to connect the first storage circuit to the receiving circuit, when the detecting circuit detects the carrier wave, and
 cause the switch to connect the first storage circuit to the reading circuit, when the detecting circuit does not detect the carrier wave, and
 convert the display data, read from the first storage circuit by the reading circuit, by reading displayable information associated with the display data in the data conversion information stored in the second storage circuit;
a display to display the displayable information associated with the display data; and
a processing circuit to process information stored in the first storage circuit based on a command received by the receiving circuit from the second device, when the receiving circuit receives identification information identifying the first device, the received command including version information of the data conversion information to be used by the processing circuit to process the information stored in the first storage circuit,
wherein the second device starts or interrupts transmission of a carrier wave at any timing.

15. An information processing method comprising:
receiving a magnetic field signal via a receiving circuit;
storing display data contained in the magnetic field signal and data conversion information associating the display data to predetermined displayable information in a first storage circuit;
reading the display data and the data conversion information stored in the first storage circuit;
detecting a carrier wave near the receiving circuit;

connecting the first storage circuit to the receiving circuit, when the carrier wave is detected;

connecting the first storage circuit to the reading circuit, when the carrier wave is not detected;

storing the read data conversion information in a second storage circuit;

converting the display data, read from the first storage circuit by the reading circuit, by reading displayable information associated with the display data in the data conversion information stored in the second storage circuit;

displaying the displayable information associated with the display data on a display; and processing information stored in the first storage circuit based on a command received in the carried wave, when the received command also includes identification information corresponding to identification information stored in the first storage circuit, the received command including version information of the data conversion information to be used in processing of the information stored in the first storage circuit.

16. A non-transitory computer-readable medium encoded with computer-readable instructions thereon, the computer-readable instructions when executed by a computer cause the computer to perform a method comprising:

receiving a magnetic field signal at a receiving circuit;

storing, in a first storage circuit, display data contained in the magnetic field signal and data conversion information associating the display data to predetermined displayable information;

reading the display data and the data conversion information stored in the first storage circuit;

detecting a carrier wave near the receiving circuit;

connecting the first storage circuit to the receiving circuit, when the carrier wave is detected;

connecting the first storage circuit to the reading circuit, when the carrier wave is not detected;

storing the read data conversion information in a second storage circuit;

converting the display data, read from the first storage circuit by the reading circuit, by reading displayable information associated with the display data in the data conversion information stored in the second storage circuit;

displaying the display data displayable information associated with the on the display; and processing information stored in the first storage circuit based on a command received in the carried wave, when the received command also includes identification information corresponding to identification information stored in the first storage circuit, the received command including version information of the data conversion information to be used in processing of the information stored in the first storage circuit.

* * * * *